United States Patent [19]

Kamo

[11] Patent Number: 5,360,634
[45] Date of Patent: Nov. 1, 1994

[54] COMPOSITION AND METHODS FOR DENSIFYING REFRACTORY OXIDE COATINGS

[75] Inventor: Lloyd Kamo, Columbus, Ind.

[73] Assignee: Adiabatics, Inc., Columbus, Ind.

[21] Appl. No.: 962,018

[22] Filed: Oct. 15, 1992

Related U.S. Application Data

[63] Continuation of Ser. No. 632,008, Nov. 21, 1990, abandoned, which is a continuation-in-part of Ser. No. 279,713, Dec. 3, 1988, which is a continuation-in-part of Ser. No. 422,678, Oct. 17, 1989, abandoned.

[51] Int. Cl.$^5$ .............................................. B05D 3/02
[52] U.S. Cl. .................................. 427/226; 427/239; 427/343; 427/344; 427/380; 427/419.2; 427/419.3
[58] Field of Search ............ 427/226, 380, 239, 419.2, 427/419.3, 344, 343

[56] References Cited

U.S. PATENT DOCUMENTS

| | | | |
|---|---|---|---|
| 3,734,767 | 5/1973 | Church et al. | 427/226 |
| 3,789,096 | 1/1974 | Church et al. | 264/60 |
| 3,817,781 | 6/1974 | Church et al. | 427/226 |
| 3,925,575 | 12/1975 | Church et al. | 427/226 |
| 3,944,683 | 3/1976 | Church et al. | 427/34 |
| 4,007,020 | 2/1977 | Church et al. | 51/295 |
| 4,615,913 | 10/1986 | Jones et al. | 427/226 |

FOREIGN PATENT DOCUMENTS

| | | |
|---|---|---|
| 59-9171 | 1/1984 | Japan . |
| 59-13073 | 1/1984 | Japan . |
| 59-47382 | 3/1984 | Japan . |
| 59-205480 | 11/1984 | Japan . |
| 59-205551 | 11/1984 | Japan . |
| 60-33351 | 2/1985 | Japan . |
| 60-46377 | 3/1985 | Japan . |
| 60-125375 | 7/1985 | Japan . |
| 60-153450 | 8/1985 | Japan . |
| 60-155677 | 8/1985 | Japan . |
| 60-234763 | 11/1985 | Japan . |
| 61-26781 | 2/1986 | Japan . |
| 61-64887 | 4/1986 | Japan . |
| 61-67540 | 4/1986 | Japan . |
| 62-60888 | 3/1987 | Japan . |
| 62-68571 | 3/1987 | Japan . |
| 62-227568 | 10/1987 | Japan . |
| 2-283679 | 11/1990 | Japan . |
| 4-19471 | 1/1992 | Japan . |
| 4-99884 | 3/1992 | Japan . |

*Primary Examiner*—Janyce Bell
*Attorney, Agent, or Firm*—Ice Miller Donadio & Ryan

[57] ABSTRACT

A new composition and methods for densifying a refractory oxide coating. The new composition includes two substituents. The first substituent is the reaction mixture produced by combining 80% formic acid and saturated aqueous chromic acid. The second substituent includes either phosphoric acid or monoaluminum phosphate. The proportions of the first substituent:second substituent vary from about 5:9 (weight:weight) to about 3:2 (weight:weight). A refractory oxide coating may be densified by first applying the new composition to the refractory oxide coating, then heating to a temperature of at least about 450° F., followed by cooling. A refractory oxide coating may be further densified by repeating this process one or more additional times. Alternatively, the first and second substituents may be sequentially applied to the refractory oxide coating before heating and cooling operations.

27 Claims, No Drawings

COMPOSITION AND METHODS FOR DENSIFYING REFRACTORY OXIDE COATINGS

This application is a continuation of U.S. patent application Ser. No. 632,008, filed Nov. 21, 1990, now abandoned and a continuation-in-part of U.S. patent application Ser. No. 279,713, filed Dec. 3, 1988, which is a continuation-in-part of U.S. patent application Ser. No. 422,678, filed Oct. 17, 1989.

FIELD OF INVENTION

This invention relates to the densification of refractory oxide coatings and their application to metal substrates, used, e.g., in the following industries: automotive, marine, aviation, and textiles. Such coatings are usually used to provide improved friction and wear surfaces, or thermal or corrosion-resistant barriers.

BACKGROUND OF INVENTION

Formerly, standard methods for densifying refractory oxide coatings by converting chromic acid in the coating to chromium (III) oxide involved application of an oxidizing solution to a refractory coating, subsequent heating to approximately 1100° F., followed by cooling. This operation had to be repeated many times in order to convert a sufficient amount of chromic acid to chromium (III) oxide to achieve a densified refractory oxide coating. One disadvantage of these methods was that temperature-sensitive substrates, such as aluminum substrates, could be deformed by heating to 1100° F. Another disadvantage of these methods was that ten to fourteen application cycles were required before satisfactory densification was achieved, thereby increasing processing costs.

Densification methods were improved by Church (e.g., U.S. Pat. Nos. 4,007,020 and 4,077,808). The Church methods improved the densification process by requiring heating at temperatures of only 600° F. However, even 600° F. will soften temperature-sensitive substrates, such as aluminum. Further, many densification steps were still required.

The present invention marks an improvement over prior compositions and methods for densifying a refractory oxide coating. The present invention requires fewer processing steps, and lower temperatures (about 450° F.) that reduce softening (referring to the annealing process of metals) and deformation of temperature-sensitive substrates.

SUMMARY OF INVENTION

The invention is a new composition and methods for refractory oxide coating densification, a process that enhances internal molecular bond integrity of the coating and strengthens the bond between the coating and a metal substrate.

The new composition includes two substituents. The first substituent is the reaction mixture produced by combining 80% formic acid and saturated aqueous chromic acid. The second substituent includes either phosphoric acid or monoaluminum phosphate. The proportions of first substituent:second substituent vary from about 5:9 (weight:weight) to about 3:2 (weight:weight).

A refractory oxide coating may be densified by first applying the new composition to the refractory oxide coating, then heating to a temperature of at least about 450° F., followed by cooling. A refractory oxide coating may be further densified by repeating this process one or more additional times.

Alternatively, the first and second substituents may be sequentially applied to the refractory oxide coating before heating and cooling operations.

Importantly, densification can be accomplished at a lower temperature (about 450° F.) than in prior densification methods.

DETAILED DESCRIPTION OF THE INVENTION

The new composition and method for densifying a refractory oxide coating may be applied to the refractory oxide coatings described in copending U.S. patent application Ser. No. 279,713 (filed Dec. 3, 1988) and U.S. patent application Ser. No. 422,678 (filed Oct. 17, 1989), the disclosures of which are hereby incorporated by reference. Specifically, the densification composition and method of the present invention may replace the densification method found in steps 3 and 5 of U.S. patent application Ser. No. 279,713, and may replace the densification method found in step 2 of U.S. patent application Ser. No. 422,678.

Densification by the present invention may be accomplished by the following procedure:

(a) applying a first composition to a refractory oxide coating, the first composition being comprised of a reaction mixture produced by combining 80% formic acid and saturated aqueous chromic acid in a ratio of 80% formic acid:saturated aqueous chromic acid from about 1:1 (weight:weight) to about 2:3 (weight:weight);

(b) applying a second composition to the refractory oxide coating before heating the refractory oxide coating, the second composition being phosphoric acid or monoaluminum phosphate;

(c) heating the refractory oxide coating, having the first and second compositions thereon, to a temperature of at least about 450° F.; and (d) cooling the densified refractory oxide coating.

The refractory oxide coating may be further densified by (e) repeating steps (a), (b), (c) and (d) in succession at least one additional time.

The first composition (referred to above) is preferably produced by adding about one part (by weight) of 80% formic acid to about one part (by weight) of saturated aqueous chromic acid. Increasing the amount of saturated aqueous chromic acid above about 3 parts (by weight) to about 2 parts (by weight) 80% formic acid will weaken the bond between the coating and substrate. Increasing the amount of 80% formic acid above about 1 part (by weight) to about 1 part (by weight) of saturated aqueous chromic acid will also weaken the bond between the coating and substrate. Because the reaction of formic acid with chromic acid is highly exothermic, this addition should be performed slowly and carefully. When the reaction is complete, as defined by the visual cessation of gas evolution, the first composition may be used for densification.

After the first composition is applied to the substrate, the second composition of phosphoric acid or monoaluminum phosphate is applied to the composition and the composition is then heated to about 450° F. but not above at an average rate of about 10° F. per minute. Following heating, the substrate is cooled to 280° F. at the rate of about 4° F. to about 5° F. per minute, then cool to room temperature at the same or faster rate, thereby achieving densification.

To further densify the refractory oxide coating, the process is repeated at least one additional time and preferably two or three more times.

A specific first composition may be prepared as follows:

Step 1.

Add approximately 100 milliliters (ml) of saturated aqueous chromic acid to a container.

Step 2.

Slowly add approximately 150 ml of 80% formic acid. (Caution should be exercised. The reaction of chromic acid with formic acid is highly exothermic and much gas is evolved.)

Step 3.

Allow the resulting reaction mixture to stand at room temperature for about two to three weeks or until bubbling has visually ceased.

The first composition, produced by the reaction of formic acid and chromic acid, may be either diluted with water or concentrated (water permitted to evaporate) to form the composition density desired for application to a refractory oxide coating. A preferred density for application to a coating is about 1.3 grams(g)/ml. If enough water is permitted to evaporate from the first composition, solids will form. These solids are soluble in water.

Alternatively, a single composition may be used for densification. The single composition is comprised of first and second substituents, the first substituent being comprised of the reaction mixture produced by combining 80% formic acid and saturated aqueous chromic acid, and the second substituent being phosphoric acid or monoaluminum phosphate. (The first substituent, the reaction mixture produced by combining 80% formic acid and saturated aqueous chromic acid, is produced in the same manner as described above with the same ratios of 80% formic acid:saturated aqueous chromic acid.) When combined to form the single composition, the proportions of first substituent:second substituent vary from about 5:9 (weight:weight) to about 3:2 (weight:weight). The greater percentage of first substituent, then improved friction and wear characteristics are imparted to the densified refractory oxide coating. However, increasing the amount of first substituent above about 60% (by weight) results in a densified coating that has decreased integrity and is more poorly bonded to a substrate. Decreasing the amount of first substituent below about 36% (by weight) results in a coating that is brittle, and will be more susceptible to fracture or crack propagation.

The single composition may be applied to a refractory oxide coating and then heated to at least about 450° F. at an average rate of about 10° F. per minute, then cooled to room temperature at the same rate. As above, this process may be repeated at least one additional time to further densify the refractory oxide coating, and preferably is repeated two to three times to further densify the coating. (It should be noted that at some point the pores in the refractory oxide coating will be completely filled, making further densification impossible.)

EXAMPLE 1

A specific refractory oxide coating has been densified by the present invention as follows:

First, a coating, formed by the method described in U.S. patent application Ser. No. 422,678, was formed on standard 6061 structural grade aluminum substrate. Coating thickness was about 0.020 inches. The coating composition was 60% (by weight) zirconium dioxide ($-325$ mesh), 25% (by weight) "TRIBALOY" T-800 cermet ($-400$ mesh) (available from Stoody Deloro Stellite Corporation, Eisenhower Drive, Goshen, Ind.), and 15% (by weight) nitric acid (aqueous, 4–8% by weight) binder. The coating is fired to 450° F. and cooled to less than 200° F. before the following is applied.

A single composition comprised of first and second substituents was then applied to the coating. About 42% (by weight) of the first substituent was added to about 58% (by weight) of the second substituent. The first substituent was comprised of the reaction mixture formed from the addition of about 1 part (by weight) 80% formic acid to about 1 part (by weight) saturated aqueous chromic acid. When reaction was complete, as defined by the visual cessation of bubbling, the reaction mixture was added to the second substituent, 80% monoaluminum phosphate. The coating was then heated to about 450° F. at an average rate of about 10° F. per minute, then cooled to 280° F. at about 4° F. to about 5° F. per minute, then cooled further to room temperature at the same or faster rate. This process was repeated two more times.

The coating produced by the above composition and method proved to be strong and durable. Further, it was discovered that the substitution of 80% phosphoric acid for 80% monoaluminum phosphate produced a similarly strong and durable coating.

A preferred single composition for densification comprises about 54% (by weight) of the first substituent and about 46% (by weight) of phosphoric acid or monoaluminum phosphate.

The compositions disclosed herein may be applied to a refractory oxide coating by any of the application methods disclosed in U.S. patent application Ser. Nos. 279,713 and 422,678 (e.g., brushing, dipping, and plasma spraying techniques).

EXAMPLE 2

A preferred coating made by the application method described in U.S. patent application Ser. No. 422,678 and the present densification methods may be made as follows:

The coating contains a mixture of 69.2% (by weight) calcium stabilized zirconium dioxide No. CS325 from Tam Ceramics, Niagara Falls, N.Y., 7.7% (by weight) "TRIBALOY" T-800 cermet powder from Stoody Deloro Stellite Corporation in Goshen, Ind., and 23.1% (by weight) of about 2.8% (by weight) aqueous nitric acid. This coating mixture is sprayed onto a 2-inch by 2-inch square 6061 aluminum plate (SAE coding). The coating is then heated to about 450° F. at a rate of about 10° F. per minute, then cooled to about 280° F. at a rate from about 4° F. to about 5° F. per minute, then cool to room temperature at the same or faster rate.

The coating is then densified in accordance with the present invention by first applying the single composition referred to above, wherein the ratio of first substituent:second substituent is about 5:9 (by weight). The coating is then heated to about 450° F. at a rate of about 10° F. per minute, then cooled to about 280° F. at a rate from about 4° F. to about 5° F. per minute, then cool to room temperature at the same or faster rate. This procedure for densification is preferably repeated two more times to further densify the coating.

EXAMPLE 3

A procedure for obtaining a plasma spray coating that is densified by the present invention is described as follows:

A plasma spray of 8% (by weight) yttrium stabilized zirconia (available from Turbine Components Corp. of Branford, Conn.) is applied to a metal substrate to a thickness of about 0.035 inch. The plasma spray has an alloy bond coat of NiCrAlY (nickel, chromium, aluminum, yttrium) of about 0.005 inch thickness applied between the metal substrate and the plasma spray zirconia. The bond coat is flame sprayed directly onto the substrate. This plasma spray refractory oxide coating is very porous.

Densification of the plasma spray coating is achieved by applying a first composition (comprised of the reaction mixture produced by combining formic acid and chromic acid, as described above) to the coating. The coating is soaked in the first composition, then removed and any excess first composition is removed by wiping the coating with a towel. Next, a second composition is applied, by brush, onto the coating. The second composition is the single densification composition, described above, wherein the ratio of first substituent:second substituent is about 5:9 (by weight). Any excess second composition is removed by wiping the coating with a towel. Next, the coating is heated to about 450° F. at a rate of about 10° F. per minute, then cooled to about 280° F. at a rate from about 4° F. to about 5° F. per minute, then cool to room temperature at the same or faster rate. This densification procedure is preferably repeated two or three more times to further densify the coating.

EXAMPLE 4

As described above for the plasma spray coating, densification of other refractory oxide coatings described herein (or the disclosures of which are incorporated by reference) may be accomplished by first applying a first composition comprised of a reaction mixture produced by combining formic and chromic acid (as described above), and next applying a second composition, which is the single densification composition described above. With these first and second compositions on the refractory oxide coating, the coating may be heated to at least about 450° F. at an average rate of about 10° F. per minute, and cooled to about 280° F. at about 4° F. to about 5° F. per minute, then cool to room temperature at the same or faster rate. This process should be repeated at least one additional time, and preferably two to three times.

EXAMPLE 5

Other variations of the present inventive methods may be used for densifying refractory oxide coatings that have been applied to ferrous substrates (e.g., steel substrates). (These alternative methods do not work well for refractory oxide coatings that have been applied to aluminum substrates because the coating becomes debonded too easily from the aluminum substrate.) Examples of these procedures are as follows:

Procedure A

The first composition (described above for the plasma spray coating) is applied to the refractory oxide coating. The coating is then heated to about 450° F. at a rate of about 10° F. per minute, then cooled to 280° F. at a rate from about 4° F. to about 5° F. per minute, then cooled to room temperature at the same or faster rate. This procedure is then repeated one additional time. Next, either phosphoric acid or monoaluminum phosphate (as described above) is applied to the refractory oxide coating. The refractory oxide coating is then heated to about 450° F. at a rate of about 10° F. per minute, then cooled to 280° F. at a rate of about 4° F. to about 5° F. per minute, then cool to room temperature at the same or faster rate.

Procedure B

This procedure is the same as in Procedure A, with the exception of the last step. In the last step, rather than applying monoaluminum phosphate or phosphoric acid, the single composition for densification (described above) is applied to the refractory oxide coating. The refractory oxide coating is then heated to about 450° F. at a rate of about 10° F. per minute, then cooled to about 280° F. at a rate from about 4° F. to about 5° F. per minute, then cool to room temperature at the same or faster rate.

An important aspect of the present invention is that densification of a refractory oxide coating may now be carried out at a temperature as low as about 450° F. Heating at this low temperature is important for two reasons. First, some substrates, such as aluminum, are temperature sensitive and can be deformed at higher temperatures. Second, ordinary home ovens can reach a temperature of 450° F., thus, eliminating the need for more expensive ceramic kilns. Further, although heating temperatures as low as about 450° F. may be used to achieve densification, any heating temperature from about 450° F. to about 500° F. represents an improvement over previous heating temperatures required for densification.

The present inventive composition and methods are applicable to refractory oxide coatings, with or without most nitrides, silicons and carbide elements in powder of fiber form, that are applied to metal substrates, used, e.g., in the automotive, marine, aviation, and textile industries; such coatings are inapplicable to magnesium and sodium metal substrates. Further, for the present invention to work as described, the refractory oxide coating should have from about 20% to about 30% open porosity. If a refractory oxide coating is more porous than about 30%, then many densification cycles must be performed, thus making the procedure inconvenient. If the refractory oxide coating is less than about 20% open porosity, densification will be insufficient and may result in a coating which will break down due to means of other bonding mechanism.

A coating produced by the present densification composition and methods is highly resistant to cracking and chipping. Further, even if a chip is induced, the coating is not readily destroyed under further wear and friction conditions. The coating wears well even under lubricationless conditions.

Particularly strong and durable refractory oxide coatings may be formed by applying the densification composition and methods of the present invention to a refractory oxide coating which has been made by heating a mixture of about one part (by weight) zirconium dioxide particles to about one part (by weight) silicon nitride particles (available in 1 micron size from Superior Graphite of Chicago, Ill.) and a nitric acid oxidizing solution, as described in U.S. patent application Ser. No. 422,678.

Many changes could be made in the above procedures and many apparently widely different embodiments of this invention could be made without departing from the scope thereof, and it is intended that all matter contained in the above description shall be interpreted as illustrative and not in a limiting sense.

What is claimed is:

1. A method for densifying a refractory oxide coating, comprising the steps of:
   (a) applying a first composition to the refractory oxide coating, the first composition being comprised of a reaction mixture produced by combining 80% formic acid and saturated aqueous chromic acid in a ratio of 80% formic acid:saturated aqueous chromic acid from about 1:1 (weight:weight) to about 2:3 (weight:weight);
   (b) applying a second composition to the refractory oxide coating, the second composition being phosphoric acid or monoaluminum phosphate;
   (c) heating the refractory oxide coating, having the first and second compositions thereon, to a temperature between about 450° F. and about 600° F., thereby densifying the refractory oxide coating; and
   (d) cooling the densified refractory oxide coating.

2. The method of claim 1, wherein the first composition is comprised of a reaction mixture produced by combining about 1 part (by weight) 80% formic acid and about 1 part (by weight) saturated aqueous chromic acid.

3. The method of claim 1, further comprising the step of:
   (e) repeating steps (a), (b), (c) and (d) in succession at least one additional time, thereby further densifying the refractory oxide coating.

4. The method of claim 5, wherein step (e) is repeated two to three times.

5. The method of claim 1, wherein the refractory oxide coating in step (c) is heated to about 450° F.

6. The method of claim 1, wherein the refractory oxide coating in step (c) is heated to about 450° F. at a rate of about 10° F. per minute.

7. The method of claim 6, wherein the ratio of first substituent:second substituent is about 42:58 (weight:weight) and step (d) is repeated two times.

8. The method of claim 1, wherein the refractory oxide coating comprises
   refractory particles dispersed throughout the refractory oxide coating,
   metal particles dispersed throughout the refractory oxide coating, the refractory particles and metal particles being bound together by oxide bonds.

9. The method of claim 2, further comprising the step of:
   repeating steps (a), (b), (c) and (d) in succession at least one additional time, thereby further densifying the refractory oxide coating.

10. A method for densifying a refractory oxide coating, comprising the steps of:
    (a) applying a composition to the refractory oxide coating, the composition being comprised of first and second substituents in a ratio of first substituent:second substituent from about 5:9 (weight:weight) to about 3:2 (weight:weight), the first substituent being comprised of a reaction mixture produced by combining 80% formic acid and saturated aqueous chromic acid in a ratio of 80% formic acid:saturated aqueous chromic acid from about 1:1 (weight:weight) to about 2:3 (weight:weight), the second substituent being phosphoric acid or monoaluminum phosphate;
    (b) heating the refractory oxide coating, having the composition thereon, to a temperature between about 450° F. and about 600° F., thereby densifying the coating; and
    (c) cooling the densified refractory oxide coating.

11. The method of claim 10, wherein the first substituent is comprised of a reaction mixture produced by combining about 1 part (by weight) 80% formic acid and about 1 part (by weight) saturated aqueous chromic acid.

12. The method of claim 10, further comprising the step of:
    (d) repeating steps (a), (b) and (c) in succession at least one additional time, thereby further densifying the refractory oxide coating.

13. The method of claim 12, wherein step (d) is repeated two to three times.

14. The method of claim 10, wherein the refractory oxide coating in step (b) is heated to a temperature of about 450° F.

15. The method of claim 14, wherein the refractory oxide coating in step (b) is heated to said temperature of about 450° F. at an average rate of about 10° F. per minute.

16. The method of claim 10, wherein the refractory oxide coating comprises
    refractory particles dispersed throughout the refractory oxide coating,
    metal particles dispersed throughout the refractory oxide coating, the refractory particles and metal particles being bound together by oxide bonds.

17. The method of claim 11, further comprising the step of:
    (d) repeating steps (a), (b) and (c) in succession at least one additional time, thereby further densifying the refractory oxide coating.

18. A method for producing a densified refractory oxide coating, comprising the steps of:
    (a) applying a slurry coating to a metal substrate, the slurry coating being comprised of refractory particles and an acidic oxidizing solution;
    (b) heating the slurry coating to a temperature sufficient to produce a hardened coating;
    (c) cooling the hardened coating; and
    (d) densifying the hardened coating by (1) applying a first composition to the refractory oxide coating, the first composition being comprised of a reaction mixture produced by combining 80% formic acid and saturated aqueous chromic acid in a ratio of 80% formic acid:saturated aqueous chromic acid from about 1:1 (weight:weight) to about 2:3 (weight:weight); (2) applying a second composition to the refractory oxide coating, the second composition being phosphoric acid or monoaluminum phosphate; (3) heating the refractory oxide coating, having the first and second compositions thereon, to a temperature between about 450° F. and about 600° F., thereby densifying the refractory oxide coating; and (4) cooling the densified refractory oxide coating.

19. The method of claim 18, wherein the first composition is comprised of a reaction mixture produced by combining about 1 part by weight 80% formic acid and about 1 part by weight saturated aqueous chromic acid.

20. The method of claim 18, further comprising the step of:
(d)(5) repeating steps (d)(1), (d)(2), (d)(3) and (d)(4) in succession at least one additional time, thereby further densifying the refractory oxide coating.

21. The method of claim 18, wherein the refractory oxide coating in step (3) is heated to about 450° F.

22. The method of claim 18, wherein the refractory oxide coating comprises refractory particles dispersed throughout the refractory oxide coating, and metal particles dispersed throughout the refractory oxide coating, the refractory particles and metal particles being bound together by oxide bonds.

23. A method for producing a densified refractory oxide coating, comprising the steps of:
(a) applying a slurry coating to a metal substrate, the slurry coating being comprised of refractory particles and an acidic oxidizing solution;
(b) heating the slurry coating to a temperature sufficient to produce a hardened coating;
(c) cooling the hardened coating; and
(d) densifying the hardened coating by
(1) applying a composition to the refractory oxide coating, the composition being comprised of first and second substituents in a ratio of first substituent:second substituent from about 5:9 (weight:weight) to about 3:2 (weight:weight), the first substituent being comprised of a reaction mixture produced by combining 80% formic acid and saturated aqueous chromic acid in a ratio of 80% formic acid:saturated aqueous chromic acid from about 1:1 (weight:weight) to about 2:3 (weight:weight), the second substituent being phosphoric acid or monoaluminum phosphate;
(2) heating the refractory oxide coating, having the composition thereon, to a temperature between about 450° F. and about 600° F., thereby densifying the coating; and
(3) cooling the densified refractory oxide coating.

24. The method of claim 23, wherein the first substituent is comprised of a reaction mixture produced by combining about 1 part by weight 80% formic acid and about 1 part by weight saturated aqueous chromic acid.

25. The method of claim 23, further comprising the step of
(d)(4) repeating steps (d)(1), (d)(2), and (d)(3) in succession at least one additional time, thereby further densifying the refractory oxide coating.

26. The method of claim 23, wherein the refractory oxide coating in step (d)(2) is heated to about 450° F.

27. The method of claim 23, wherein the refractory oxide coating comprises refractory particles dispersed throughout the refractory oxide coating, and metal particles dispersed throughout the refractory oxide coating, the refractory particles and metal particles being bound together by oxide bonds.

* * * * *